US010035548B2

(12) United States Patent
Barber (10) Patent No.: US 10,035,548 B2
(45) Date of Patent: Jul. 31, 2018

(54) ACTIVE SPOILER FOR A MOTOR VEHICLE (71) Applicant: GM GLOBAL TECHNOLOGY OPERATIONS LLC, Detroit, MI (US)

(72) Inventor: Christopher J. Barber, West Bloomfield, MI (US)

(73) Assignee: GM Global Technology Operations LLC, Detroit, MI (US)

(*) Notice: Subject to any disclaimer, the term of this patent is extended or adjusted under 35 U.S.C. 154(b) by 37 days.

(21) Appl. No.: 15/233,256

(22) Filed: Aug. 10, 2016

(65) Prior Publication Data
US 2018/0043946 A1 Feb. 15, 2018

(51) Int. Cl.
B62D 35/00 (2006.01)
B62D 37/02 (2006.01)

(52) U.S. Cl.
CPC ........... *B62D 35/007* (2013.01); *B62D 37/02* (2013.01)

(58) Field of Classification Search
CPC .............................. B62D 35/007; B62D 37/02
See application file for complete search history.

(56) References Cited

FOREIGN PATENT DOCUMENTS

WO    WO-2017073253 A1 *  5/2017  ............... B60Q 1/30

* cited by examiner

*Primary Examiner* — Darrell G Dayoan
*Assistant Examiner* — Melissa Ann Black
(74) *Attorney, Agent, or Firm* — Quinn IP Law (57) ABSTRACT

An active spoiler system for a vehicle includes a spoiler body having an airfoil shape in a cross-sectional view. The vehicle includes a vehicle body arranged along a longitudinal body axis and having a first vehicle body end configured to face oncoming ambient airflow and an opposing second vehicle body end. The spoiler body is configured to be moveably mounted between the first vehicle body end and the second vehicle body end to generate an aerodynamic downforce on the vehicle body when the vehicle is in motion. The spoiler system also includes a first mechanism configured to selectively translate the spoiler body along the longitudinal body axis to thereby adjust along the longitudinal body axis a location of the aerodynamic downforce generated by the spoiler body.

14 Claims, 4 Drawing Sheets

ACTIVE SPOILER FOR A MOTOR VEHICLE

TECHNICAL FIELD

The disclosure relates to an active spoiler for enhancement of aerodynamics of a motor vehicle.

BACKGROUND

Aerodynamics is a significant factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds. Additionally, the study of aerodynamics may also be used to achieve downforce in high-performance vehicles in order to improve vehicle traction and cornering abilities. The study is typically used to shape vehicle bodywork and add-on devices for achieving a desired compromise among the above characteristics for specific vehicle use.

A spoiler is an automotive aerodynamic device intended to "spoil" unfavorable air movement across a body of a vehicle in motion, usually described as turbulence or drag. Spoilers can be fitted at the front and/or at the rear of the vehicle body. Spoilers on the front of a vehicle are often called air dams.

When the vehicle is in motion, in addition to directing air flow, such front air dams also reduce the amount of air flowing underneath the vehicle which generally reduces aerodynamic lift and drag. Additionally, when the vehicle is in motion, the flow of air at the rear of the vehicle becomes turbulent and a low-pressure zone is created, increasing drag and instability. Adding a spoiler at the rear of the vehicle body can help to delay airflow separation from the body and a higher pressure zone created in front of the spoiler can help reduce lift on the vehicle body by creating downforce. In such instances, a rear spoiler can increase high speed stability of the vehicle due to the reduced rear lift. In other instances, a rear spoiler can be used to streamline the airflow to reduce aerodynamic drag of the vehicle body.

SUMMARY

An active spoiler system for a vehicle includes a spoiler body having an airfoil shape in a cross-sectional view. The vehicle includes a vehicle body arranged along a longitudinal body axis and having a first vehicle body end configured to face oncoming ambient airflow and an opposing second vehicle body end. The spoiler body is configured to be moveably mounted between the first vehicle body end and the second vehicle body end to generate an aerodynamic downforce on the vehicle body when the vehicle is in motion. The spoiler system also includes a first mechanism configured to selectively translate the spoiler body along the longitudinal body axis to thereby adjust along the longitudinal body axis a location of the aerodynamic downforce generated by the spoiler body.

The first mechanism can include a track configured to be arranged on the vehicle body along the longitudinal body axis, a first stanchion configured to support the spoiler body relative to the vehicle body and slidably connected to the track, and a first electric motor configured to translate the spoiler body along the track. The first stanchion can be a fixed-orientation stanchion configured to maintain a fixed height of the spoiler body relative to the vehicle body.

The first mechanism can additionally include a worm gear. In such a case, the worm gear can operatively connect the first electric motor to the spoiler body.

The first stanchion can be pivotably connected to the spoiler body and to the track, and can also be operatively connected to the first electric motor. In such a case, the first mechanism can additionally include a second stanchion configured to support the spoiler body relative to the vehicle body and be pivotably connected to each of the vehicle body and the spoiler body. Accordingly, in such an embodiment, the first and second stanchions together are configured to support the spoiler body and selectively vary a height of the spoiler body relative to the vehicle body.

The active spoiler system can additionally include a second mechanism configured to selectively pivot the spoiler body relative to the vehicle body to thereby vary an angle of attack of the spoiler body and adjust a magnitude of the aerodynamic downforce generated by the spoiler body.

The second mechanism can include a second electric motor configured to pivot the spoiler body relative to the vehicle body. The second electric motor can be positioned at an interface between the spoiler body and the first stanchion.

The active spoiler system can additionally include an electronic controller configured, i.e., programmed in software and equipped in hardware, to regulate each of the first mechanism and the second mechanism.

The active spoiler system can additionally include a sensor in communication with the electronic controller and configured to detect a vehicle operating parameter.

The electronic controller can be programmed to selectively translate the spoiler body along the longitudinal body axis and/or vary the angle of attack of the spoiler body according to a lookup table. Such a lookup table can establish a correspondence between the detected vehicle operating parameter and a desired position of the spoiler body along the longitudinal body axis. Additionally, the subject lookup table can establish a correspondence between the detected vehicle operating parameter and the angle of attack of the spoiler body.

The vehicle may also include a road wheel and the active spoiler system may further include a first sensor configured to detect a rotating speed of the road wheel and communicate the detected rotating speed of the road wheel to the electronic controller.

The active spoiler system may also include a second sensor configured to detect a yaw rate of the vehicle body and communicate the detected yaw rate to the electronic controller.

The active spoiler system may also include a third sensor configured to detect a velocity of ambient airflow relative to the vehicle and communicate the detected velocity of the ambient airflow to the electronic controller.

The vehicle may additionally include a steering wheel and the active spoiler system may further include a fourth sensor configured to detect an angle of the steering wheel.

The controller may be configured to selectively translate the spoiler body along the longitudinal body axis and/or vary the angle of attack of the spoiler body via the respective first and second mechanisms during vehicle cornering. Such translation of the spoiler body along the longitudinal body axis and/or variation of the angle of attack of the spoiler body can be accomplished in response to the detected yaw rate, the detected angle of the steering wheel, and at least one of the detected rotating speed of the road wheel and velocity of the ambient airflow. The above movement of the spoiler body can be employed to vary the aerodynamic downforce on the vehicle body and control the detected yaw rate.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
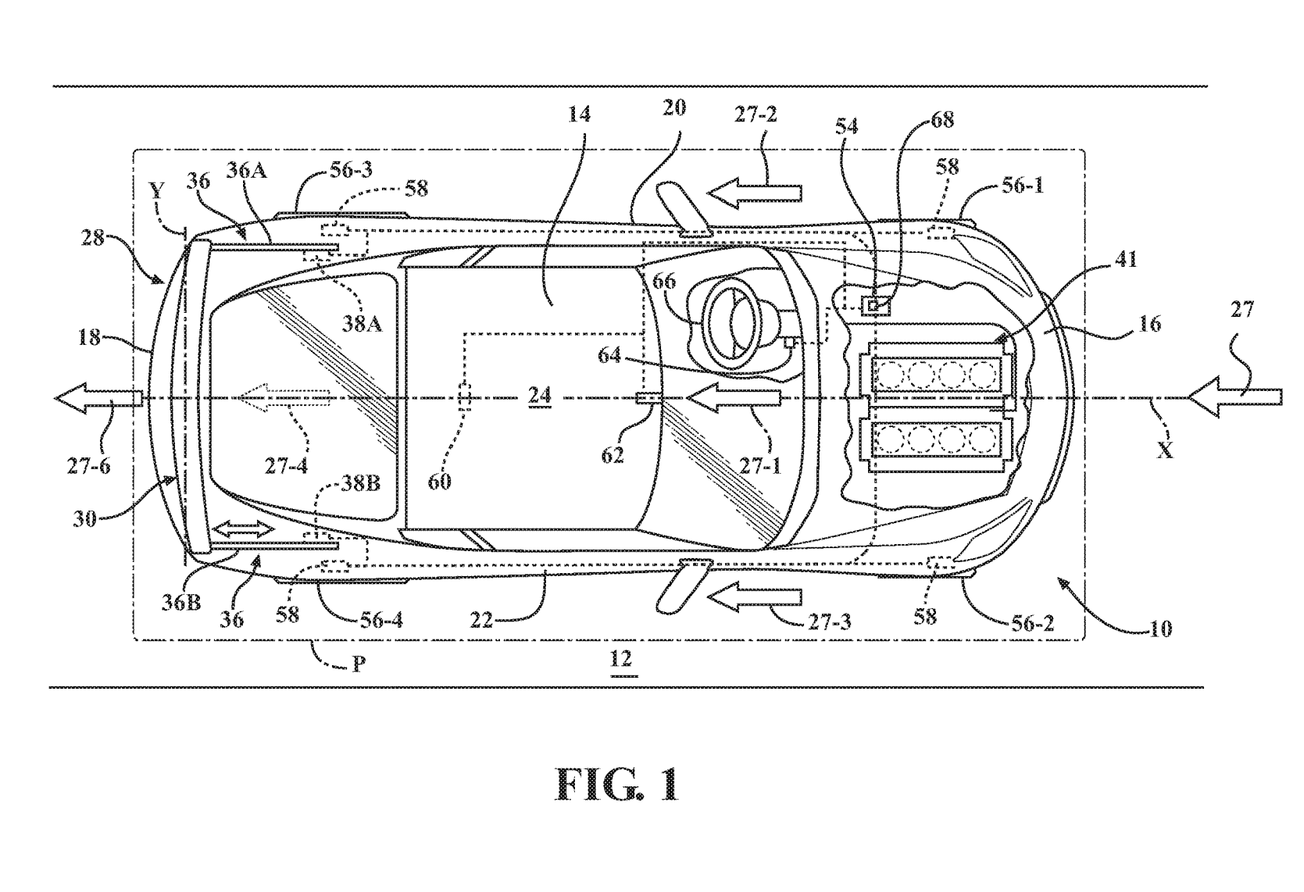
FIG. 1 is a schematic top view of a vehicle having a vehicle body arranged in a body plane along a longitudinal axis, and having an active spoiler system with a translating and tilting spoiler body according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged in a body plane P that is substantially parallel to the road surface 12. The vehicle body 14 defines six body sides. The six body sides include a first body end or front end 16, an opposing second body end or rear end 18, a first lateral body side or left side 20, a second lateral body side or right side 22, a top body portion 24, and an underbody portion (not shown).

The left side 20 and right side 22 are disposed generally parallel to each other and with respect to a virtual longitudinal body axis X of the vehicle 10, and span the distance between the front end 16 and the rear end 18. The body plane P is defined to include the longitudinal axis X. The front end 16 is configured to face an oncoming, i.e., incident or approaching, ambient airflow 27 when the vehicle 10 is in motion relative to the road surface 12. When the vehicle 10 is in motion, the oncoming ambient airflow 27 moves substantially parallel to the body plane P and along the longitudinal axis X. The top body portion 24 is generally disposed between the front end 16 and the rear end 18 and may include a vehicle roof, a vehicle trunk lid, and a hood or bonnet. The top body portion 24 may at least partially cover a passenger compartment, a powertrain compartment, and a cargo area, neither of which is specifically shown, but is generally known to those skilled in the art. Accordingly, as understood by those skilled in the art, the top body portion 24 may include a vehicle roof, a vehicle hood or bonnet, and a trunk lid. The top body portion 24 is generally bounded by, i.e., disposed between, the respective front and rear ends 16, 18 and the respective left and right sides 20, 22 of the body 14.

As the vehicle 10 moves relative to the road surface 12, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and the fourth airflow portion 27-4 passes under the vehicle body 14, between the underbody portion and the road surface 12. As understood by those skilled in the art, the recirculating airflow region 27-6 is generally caused at elevated vehicle speeds by the flow of surrounding air around the six body sides of the vehicle body 14.

Figure 2:
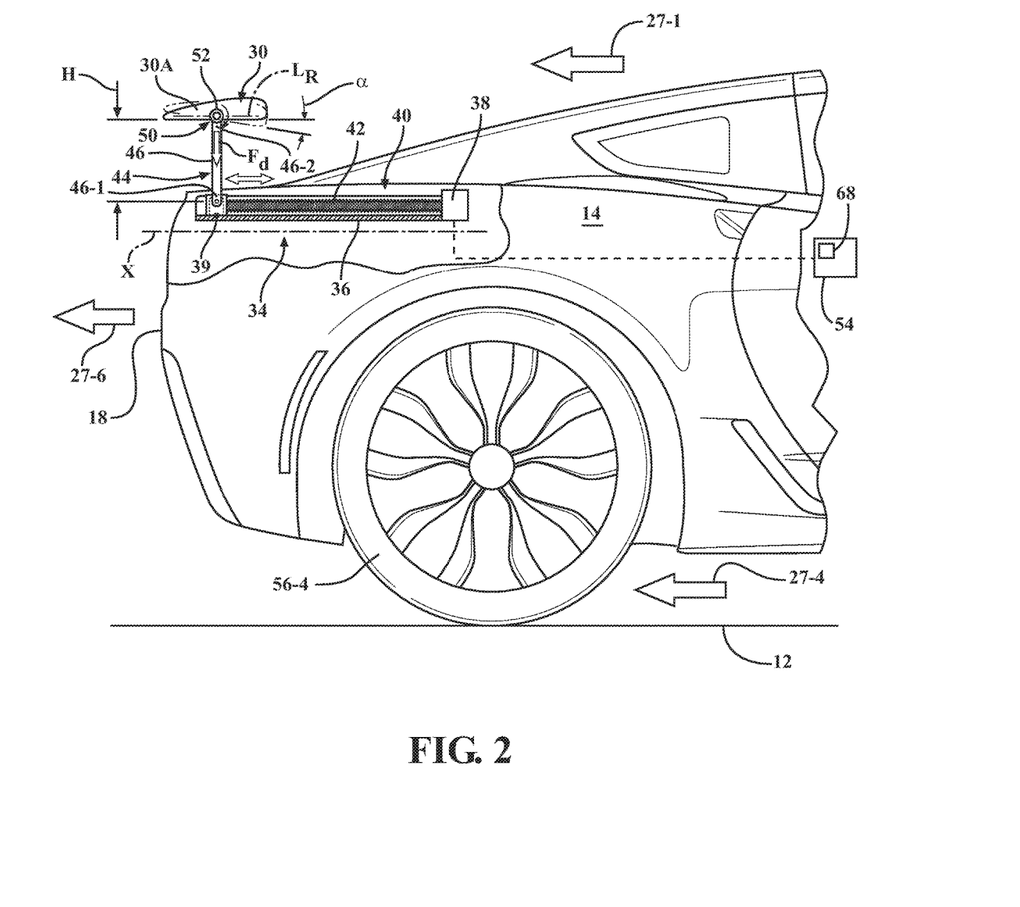
FIG. 2 is a schematic partial side view of the vehicle shown in FIG. 1, depicting a cross-sectional side view of an airfoil spoiler body positioned proximate to a rear end of the vehicle and tilted to increase a downforce on the rear end of the vehicle body, according to an embodiment of the disclosure.
Figure 3:
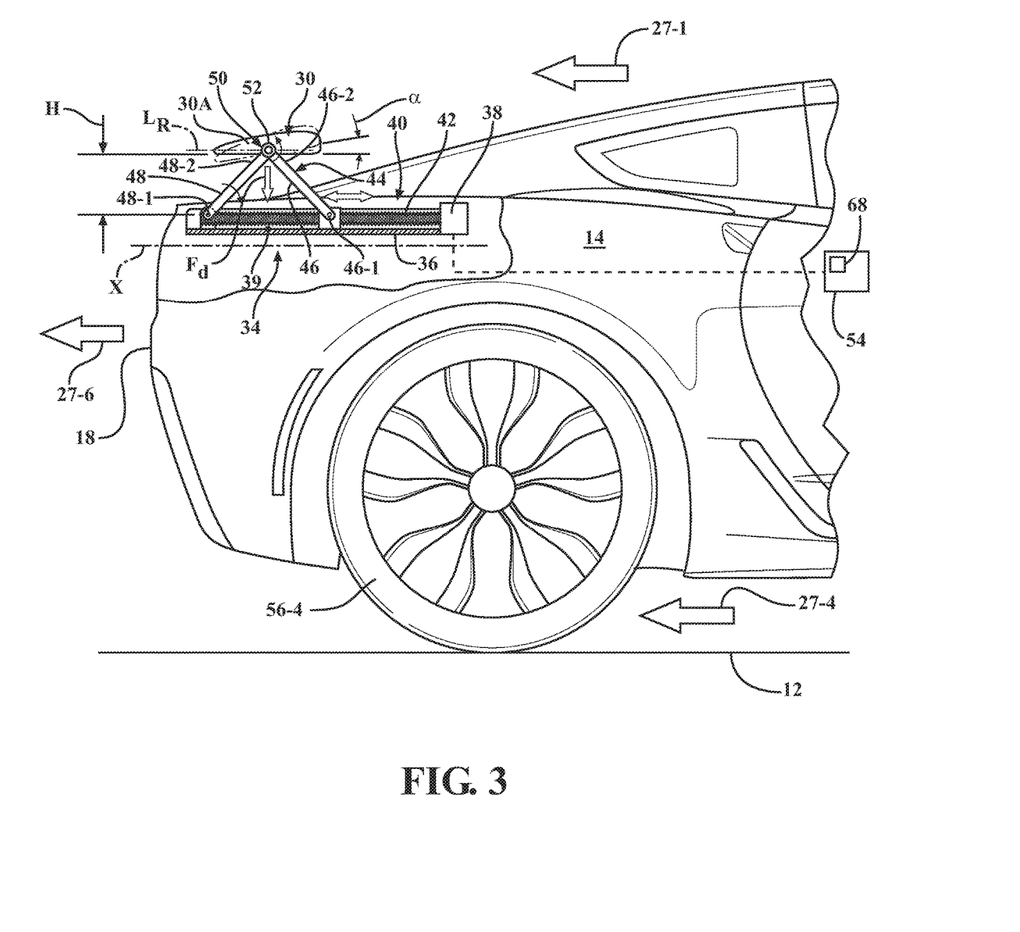
FIG. 3 is a schematic partial side view of the vehicle shown in FIG. 1, depicting the spoiler body translated toward a front end of the vehicle and tilted to decrease a downforce between the front and rear ends of the vehicle body, according to another embodiment of the disclosure.
Figure 4:
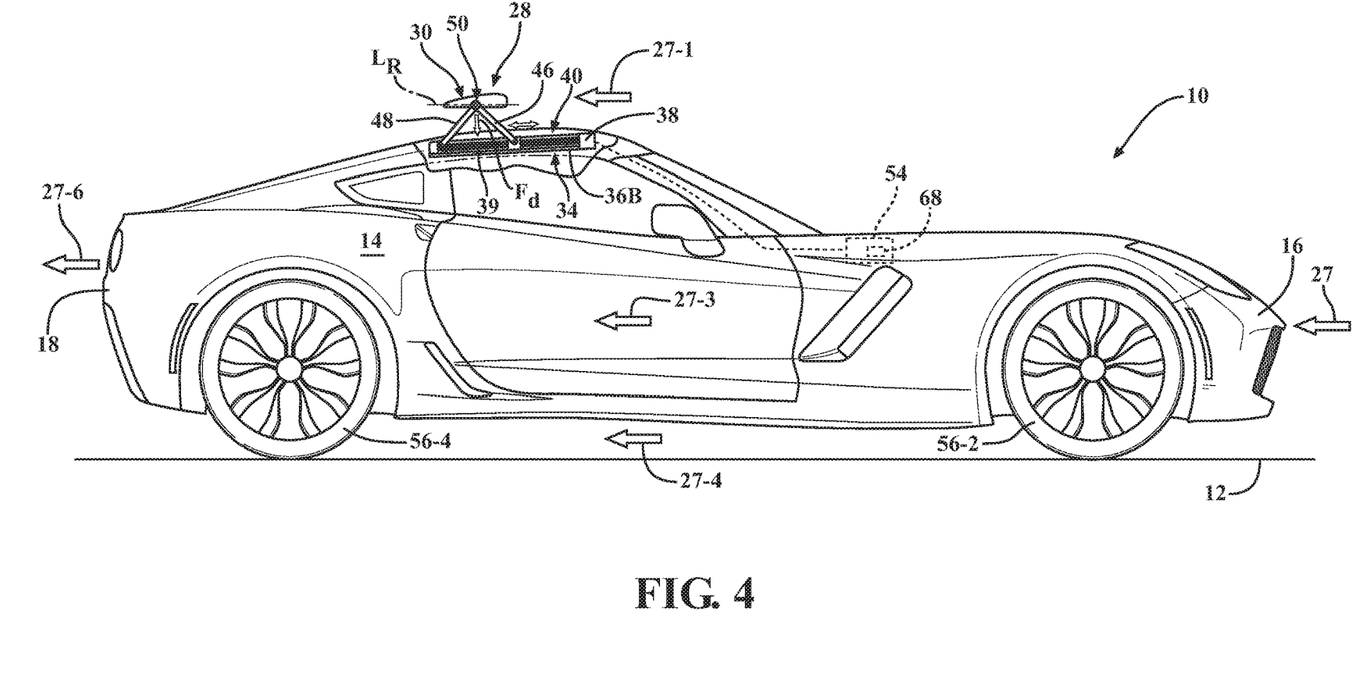
FIG. 4 is a schematic side view of the vehicle illustrating the spoiler assembly arranged on the roof of the vehicle, according to yet another embodiment of the disclosure.

As shown in FIGS. 1 and 2, the vehicle 10 also includes an active spoiler system 28. The active spoiler system 28 includes a spoiler body 30 arranged along a spoiler body axis Y and configured to control a movement of the ambient airflow 27 along the longitudinal body axis X of the vehicle body 14. A cross-sectional view of the spoiler body 30 can be seen in a side view of the vehicle 10 shown in FIG. 2. As shown in the cross-sectional view, the spoiler body 30 has an airfoil shape 30A, i.e., a streamlined shape of a wing or a fin producing lift for flight or propulsion through a fluid. As also shown, the spoiler body 30 is moveably mounted between the respective front end 16 and the rear end 18 to generate an aerodynamic downforce $F_d$ on the vehicle body 14 when the vehicle 10 is in motion. As shown in FIGS. 1-3, the active spoiler system 28 can be arranged proximate the rear end 18, such as to the vehicle's rear quarter panels, as understood by those skilled in the art. Alternatively, as shown in FIG. 4, the active spoiler system 28 can be mounted to the top body portion 24, such as to the vehicle's roof. As understood, generally, a pressure differential generated by the spoiler body 30 between the first airflow portion 27-1 and the fourth airflow portion 27-4, with the pressure bias favoring the first airflow portion, determines the amount of aerodynamic downforce $F_d$ acting on the vehicle body 14.

As shown in FIGS. 2-3, the active spoiler system 28 also includes a first mechanism 34 configured to translate the spoiler body 30 relative to each of the front end 16 and the rear end 18 in a direction 32 along the axis X and substantially parallel to the road surface 12. More specifically, the first mechanism 34 may include a track 36 shown as arranged on the vehicle body 14 along the longitudinal body axis X, along at least a part of the top body portion 24. As can be seen in FIG. 1, the track 36 includes a left track 36A arranged proximate the left side 20 and a parallel right track 36B arranged proximate the right side 22. The first mechanism 34 may also include an actuator configured to selectively translate the spoiler body 30 along the track 36, between the front end 16 and the rear end 18. Such an actuator can operate on an electro-mechanical principle, can be hydraulic, pneumatic, or mechanical in nature, or employ a combination thereof. For example, the actuator can include a first electric motor 38 configured to translate the spoiler body 30 along the track 36. As can be seen in FIG. 1, the active spoiler system 28 can employ a left-side first electric motor 38A for the left track 36A and a separate right-side first electric motor 38B the right track 36B. As a result of the translation of the spoiler body 30 along the longitudinal axis X a location 39 where the aerodynamic downforce $F_d$ acts on the vehicle body 14 will shift along the longitudinal axis, as well. Accordingly, such varying of the specific location 39 of the aerodynamic downforce $F_d$ between the first and second vehicle body ends 16, 18 can be employed to enhance high speed stability the vehicle 10 and the vehicle's ability to maintain a selected line through a turn.

The first mechanism 34 can also include a gear-train 40 in connection with the actuator, such as with the first electric motor 38, as shown in FIGS. 2-3, to affect the desired translation of the spoiler body 30 along the longitudinal body axis X. The gear-train 40 can specifically include a worm gear 42 to operatively connect the first electric motor 38 to the spoiler body 30. Although not specifically shown, the gear-train 40 can employ a left-side gear-train in connection with the left-side first electric motor 38A and a separate right-side gear-train in connection with the right-side first electric motor 38B. As shown in FIGS. 2-3, the first mechanism 34 can additionally include a stanchion assembly 44. As shown in the embodiment of FIG. 2, the stanchion assembly 44 can include first stanchions 46 configured to support the spoiler body 30 relative to the vehicle body 14. One such first stanchions 46 can be positioned on the left side 20 and another such first stanchion can be positioned on the right side 22. As shown, each of the first stanchions 46 is slidably connected to the track 36 at a first stanchion end 46-1 via a bearing or a roller, and is pivotably connected to the spoiler body 30 at a second stanchion end 46-2. Each first stanchion 46 is also operatively connected, at the first stanchion end 46-1, to the first electric motor 38. In the embodiment of FIG. 2, the first stanchion 46 is a fixed-orientation stanchion configured to maintain a fixed height H of the spoiler body 30 relative to the vehicle body 14.

As shown in the embodiment of FIG. 3, in addition to the first stanchions 46, the stanchion assembly 44 can include second stanchions 48 configured to support the spoiler body 30 relative to the vehicle body 14. One of the second stanchions 48 can be positioned on the left side 20 and the other second stanchion can be positioned on the right side 22. In the present embodiment the first stanchions 46 are pivotably connected to the track 36. As shown, each of the second stanchions 48 is pivotably connected to the vehicle body 14, such as to the track 36, at a first stanchion end 48-1, but is fixed in the longitudinal axis X direction. The second stanchions 48 are also pivotably connected to the spoiler body 30 at second stanchion ends 48-2. One of the first stanchions 46 and one of the second stanchions 48 arranged on the same, either the left side 20 or the right side 22, of the vehicle body 14 can be connected to the spoiler body 30 at a generally common location, or at locations separated by some predetermined distance. Similar to the embodiment of FIG. 2, in the stanchion assembly 44 of FIG. 3, at least one of the first stanchions 46 is operatively connected to the first electric motor 38. In the stanchion assembly 44 of FIG. 3, the first stanchions 46 and the second stanchions 48 are together configured to support the spoiler body 30 and selectively vary the height H of the spoiler body relative to the vehicle body 14.

In the embodiment of FIG. 3, as the stanchion assembly 44 is energized by the actuator, for example by the first electric motor 38, the first stanchion ends 46-1 of the first stanchions 46 will shift along the track 36. However, because the first stanchion ends 48-1 of the second stanchions 48 are fixed in the longitudinal axis X direction and the second ends 46-2, 48-2 are pivotably connected to the spoiler body 30, all first and second stanchions 46, 48 will pivot at their respective first stanchion ends 46-1, 48-1. As the first and second stanchions 46, 48 thus pivot, the spoiler body 30 will not only shift along the longitudinal axis X, but the height H of the spoiler body will vary, i.e., be either elevated or lowered relative to the vehicle body 14. The first mechanism 34 can also be configured to shift the first stanchion ends 46-1 of the second stanchions 46 away from the first stanchion ends 48-1 of the second stanchions 48 to the extent that the spoiler body 30 is made to lay against the top body portion 24 and substantially out of the way of the first airflow portion 27-1.

The active spoiler system 28 can also include a second mechanism 50 configured to selectively pivot and vary an incline of the spoiler body 30 relative to the vehicle body 14. The variation in incline of the spoiler body 30 is intended to vary an angle of attack α of the spoiler body relative to the first airflow portion 27-1 and adjust a magnitude of the aerodynamic downforce $F_d$ generated by the spoiler body. In fluid dynamics, "angle of attack" α is the angle between a reference line on a body, such as a cord line of a wing or airfoil, and a vector representing the relative motion between the body and the fluid through which it is moving. As understood by those skilled in the art, with respect to the airfoil 30A moving through the atmosphere, the angle of attack α specifies the angle between the airfoil's reference line $L_R$ and the oncoming first airflow portion 27-1. The second mechanism 50 can include one or more second electric motors 52 configured to pivot the spoiler body 30 relative to the vehicle body 14. The second electric motor(s) 52 can be positioned at an interface between the spoiler body 30 and the stanchion(s) 46, 48. Specifically, one second electric motor 52 can be arranged at the second stanchion end 46-2 and/or 48-2 on each of the left and the right side interface between the stanchion assembly 44 and the spoiler body 30, or a single second motor can be used on only one of the two sides. Accordingly, such varying of the magnitude of the aerodynamic downforce $F_d$ can be employed to further enhance high speed stability of the vehicle 10 and the vehicle's ability to maintain a selected line through a turn.

As shown in FIGS. 1-3, the vehicle 10 also includes an electronic controller 54 configured, i.e., constructed and programmed, to regulate each of the first mechanism 34 and the second mechanism 50. The controller 54 may be configured as a central processing unit (CPU) intended to regulate operation of an internal combustion engine 55 (shown in FIG. 1), a hybrid-electric powertrain (not shown), or other alternative types of powerplants, as well as other vehicle systems, or a dedicated controller. In order to appropriately control operation of the mechanism 34, the controller 54 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 54 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 54 may also include a floppy disk, a flexible disk, hard disk, magnetic tape, any other magnetic medium, a CD-ROM, DVD, any other optical medium, etc. The controller 54 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 54 or accessible thereby may be stored in the memory and automatically executed to provide the required functionality.

As shown in FIG. 1, the vehicle 10 also includes road wheels, shown as a left front road wheel 56-1, a right front road wheel 56-2, a left rear road wheel 56-3, and a right rear road wheel 56-4. The active spoiler system 28 can also include sensors in communication with the electronic controller 54 for detecting various vehicle operating parameters. For example, a plurality of first sensors 58 may be arranged on the vehicle body 14 for detecting rotating speeds of each road wheel 56-1, 56-2, 56-3, and 56-4. Each first sensor 58 may also be configured to communicate the detected rotating speed of the respective road wheel 56-1, 56-2, 56-3, or 56-4 to the controller 54, while the controller may be configured to correlate the data received from the respective first sensors to road speed of the vehicle 10. The active spoiler system 28 may also include a second sensor 60 configured to detect a yaw moment or rate on the vehicle body 14 relative to the road surface 12 and communicate the detected yaw rate to the controller 54. The active spoiler system 28 may additionally include a third sensor 62 configured to detect a velocity of incident ambient airflow 27 relative to the vehicle 10 and communicate the detected velocity of the ambient airflow to the controller 54. The third sensor 62 may be a pitot tube configured to detect a pressure of the ambient airflow 27 at a specific location relative to the vehicle body 14, and the controller 54 can correlate the measured pressure to airflow velocity.

The controller 54 can also be configured to selectively translate the spoiler body 30 via the first mechanism 34 and/or vary the angle of attack α of the spoiler body via the second mechanism 50 during cornering of the vehicle 10 in response to the yaw rate detected by the second sensor 60. For example, if the vehicle 10 is negotiating a high-g turn and experiences oversteer, i.e., where the front road wheels 56-1, 56-2 are following an intended line through the turn, but the rear road wheels 56-3, 56-4 are slipping at the road surface 12 and running wide, the spoiler body 30 can be translated along the longitudinal axis X toward the rear end 18 of the vehicle. Translating the spoiler body 30 toward the rear end 18 in such a situation will result in the location 39 where the aerodynamic downforce $F_d$ acts on the vehicle body 14 being shifted to the rear end and to increase the grip of the slipping road wheels 56-3, 56-4.

On the other hand, if the vehicle 10 is negotiating a high-g turn and experiences understeer, i.e., where it is the front road wheels 56-1, 56-2 that are slipping at the road surface 12 and running wide of an intended line through the turn, the spoiler body 30 can be shifted along the longitudinal axis X toward the front end 16 of the vehicle. Thus translating the spoiler body 30 in such a situation will result in a shift of the location 39 where the aerodynamic downforce $F_d$ acts on the vehicle body 14 toward the front end 16 and will thus increase the grip of the slipping front road wheels 56-1, 56-2. Accordingly, the position of the spoiler body 30 can be regulated via the controller 54 proportionately to the yaw rate generated during cornering of the vehicle 10 and/or the vehicle's road speed.

The controller 54 may be configured to selectively shift and/or tilt the spoiler body 30, via the respective first mechanism 34 and the second mechanism 50 relative to the vehicle body 14 in response to the rotating speeds of the road wheels 56-1, 56-2, 56-3, and 56-4 detected via the first sensor 58 and/or the velocity of the ambient airflow 27 detected via the third sensor 62. For example, if the vehicle 10 is traveling at an elevated road speed, the spoiler body 30 can be translated toward the front end 16 and/or tilted to increase the angle of attack α to increase the aerodynamic downforce $F_d$ acting on the front road wheels 56-1, 56-2, and thereby enhance the stability and steering response of the vehicle at such conditions. On the other hand, the spoiler body 30 can be translated toward the rear end 18 and/or tilted to decrease the angle of attack α to thereby decrease the downforce $F_d$, and, as a result, decrease aerodynamic drag of the vehicle 10.

The controller 54 may also be programmed to determine a slip of the vehicle 10 relative to the road surface 12. The slip of the vehicle 10 may include a measure of how much each of the road wheels 56 has slipped in a direction that is generally perpendicular to the longitudinal vehicle axis X, which identifies that the vehicle has deviated from an intended direction or path along the road surface 12. The intended direction of the vehicle 10 may be identified by the steering wheel angle, which can be detected by a fourth sensor 64 operatively connected to a steering wheel 66 (shown in FIG. 1) and communicated to the controller 54. Furthermore, the controller 54 may be programmed to compare the determined steering wheel angle and yaw rate to determine how much the vehicle 10 has deviated from its intended direction or path. Accordingly, the controller 54 may also be configured to control the slip of the vehicle 10 relative to the road surface 12 by controlling the position of the spoiler body 30 relative to the road surface 12 via the first mechanism 34 and/or the second mechanism 50 in response to how much the vehicle has deviated from its intended path. The employed change in the position and/or the angle of attack α of the spoiler body 30 then urges the vehicle 10 to return the actual vehicle heading to the desired heading being commanded by an operator of the vehicle at the steering wheel 66.

The controller 54 may be additionally programmed with a lookup table 68 establishing correspondence between any of the previously described detected vehicle operating parameters, i.e., the vehicle slip, yaw rate, vehicle road speed, and/or velocity of the airflow, and the appropriate or desired position of the spoiler body 30 along the longitudinal body axis X resulting in the most beneficial location 39 of the aerodynamic downforce $F_d$. Additionally, the lookup table 68 can establish a correspondence between the detected vehicle operating parameter(s) and a desired angle of attack α of the spoiler body 30. The lookup table 68 may be developed empirically during validation and testing of the vehicle 10. The electronic controller 54 can, therefore, be configured to selectively translate the spoiler body 30 along the longitudinal body axis X and/or vary the angle of attack α of the spoiler body according to the lookup table 68. The lookup table 68 can, therefore be employed to adjust the aerodynamic downforce $F_d$ on the vehicle body 14 during a specific cornering event or at elevated road speeds to affect the dynamic behavior of the vehicle 10.

Overall, control of the position of the spoiler body 30 may be employed to maintain contact of the vehicle 10 with the road surface 12 at elevated speeds by countering aerodynamic lift of the vehicle body 14 in response to the velocity of ambient airflow 27 detected by the third sensor 62. Additionally, control of the position of the spoiler body 30 may be employed to aid handling of the vehicle 10 in order to maintain the vehicle on its intended path by countering and controlling the yaw moment acting on the vehicle body 14 as detected by the second sensor 60.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An active spoiler system for a vehicle having a vehicle body arranged along a longitudinal body axis and including a first vehicle body end configured to face oncoming ambient airflow and an opposing second vehicle body end, the active spoiler system comprising:
 a spoiler body having an airfoil shape in a cross-sectional view and configured to be moveably mounted between the first vehicle body end and the second vehicle body end to generate an aerodynamic downforce on the vehicle body when the vehicle is in motion; and
 a first mechanism configured to selectively translate the spoiler body along the longitudinal body axis to thereby adjust along the longitudinal body axis a location of the aerodynamic downforce generated by the spoiler body, wherein the first mechanism includes:
  a track configured to be arranged on the vehicle body along the longitudinal body axis;
  a first stanchion configured to support the spoiler body relative to the vehicle body and slidably connected to the track; and
  a first electric motor configured to translate the spoiler body along the track; and
 a second mechanism configured to selectively pivot the spoiler body relative to the vehicle body to thereby vary an angle of attack of the spoiler body and adjust a magnitude of the aerodynamic downforce generated by the spoiler body, wherein the second mechanism includes a second electric motor configured to pivot the spoiler body relative to the vehicle body.

2. The active spoiler system according to claim 1, wherein the first mechanism additionally includes a worm gear, and wherein the worm gear operatively connects the first electric motor to the spoiler body.

3. The active spoiler system according to claim 1, wherein: the first stanchion is pivotably connected to the spoiler body and to the track and operatively connected to the first electric motor; and the first mechanism additionally includes a second stanchion configured to support the spoiler body relative to the vehicle body and pivotably connected to each of the vehicle body and the spoiler body.

4. The active spoiler system according to claim 3, wherein the first stanchion and the second stanchion are together configured to selectively vary a height of the spoiler body relative to the vehicle body.

5. The active spoiler system according to claim 1, further comprising an electronic controller configured to regulate each of the first mechanism and the second mechanism.

6. The active spoiler system according to claim 5, further comprising a sensor in communication with the electronic controller and configured to detect a vehicle operating parameter.

7. The active spoiler system according to claim 6, wherein the electronic controller is programmed to at least one of selectively translate the spoiler body along the longitudinal body axis and vary the angle of attack of the spoiler body according to a lookup table, and wherein the lookup table establishes:
 a correspondence between the detected vehicle operating parameter and a desired position of the spoiler body along the longitudinal body axis; and
 a correspondence between the detected vehicle operating parameter and a desired angle of attack of the spoiler body.

8. A vehicle comprising:
 a vehicle body arranged along a longitudinal body axis and having a first vehicle body end configured to face incident ambient airflow and an opposing second vehicle body end; and
 an active spoiler system having:
  a spoiler body having an airfoil shape in a cross-sectional view and configured to be moveably mounted between the first vehicle body end and the second vehicle body end to generate an aerodynamic downforce on the vehicle body when the vehicle is in motion; and
  a first mechanism configured to selectively translate the spoiler body along the longitudinal body axis to thereby adjust along the longitudinal body axis a location of the aerodynamic downforce generated by the spoiler body, wherein the first mechanism includes:
   a track configured to be arranged on the vehicle body along the longitudinal body axis;
   a first stanchion configured to support the spoiler body relative to the vehicle body and slidably connected to the track; and
   a first electric motor configured to translate the spoiler body along the track; and
  a second mechanism configured to selectively pivot the spoiler body relative to the vehicle body to thereby vary an angle of attack of the spoiler body and adjust a magnitude of the aerodynamic downforce generated by the spoiler body, wherein the second mechanism includes a second electric motor configured to pivot the spoiler body relative to the vehicle body.

9. The vehicle according to claim 8, wherein the first mechanism additionally includes a worm gear, and wherein the worm gear operatively connects the first electric motor to the spoiler body.

10. The vehicle according to claim 8, wherein: the first stanchion is pivotably connected to the track and operatively connected to the first electric motor; and the first mechanism additionally includes a second stanchion configured to support the spoiler body relative to the vehicle body and pivotably connected to each of the vehicle body and the spoiler body.

11. The vehicle according to claim 10, wherein the first stanchion and the second stanchion are together configured to selectively vary a height of the spoiler body relative to the vehicle body.

12. The vehicle according to claim 8, wherein the active spoiler system additionally includes an electronic controller configured to regulate each of the first mechanism and the second mechanism.

13. The vehicle according to claim 12, wherein the active spoiler system additionally includes a sensor in communication with the electronic controller and configured to detect a vehicle operating parameter.

14. The vehicle according to claim 13, wherein the electronic controller is programmed to at least one of selectively translate the spoiler body along the longitudinal body axis and vary the angle of attack of the spoiler body according to a lookup table, wherein the lookup table establishes:
  a correspondence between the detected vehicle operating parameter and a desired position of the spoiler body along the longitudinal body axis; and
  a correspondence between the detected vehicle operating parameter and a desired angle of attack of the spoiler body.

* * * * *